H. F. RICHTER.
PNEUMATIC TIRE VALVE.
APPLICATION FILED FEB. 12, 1921.
1,420,499.
Patented June 20, 1922.
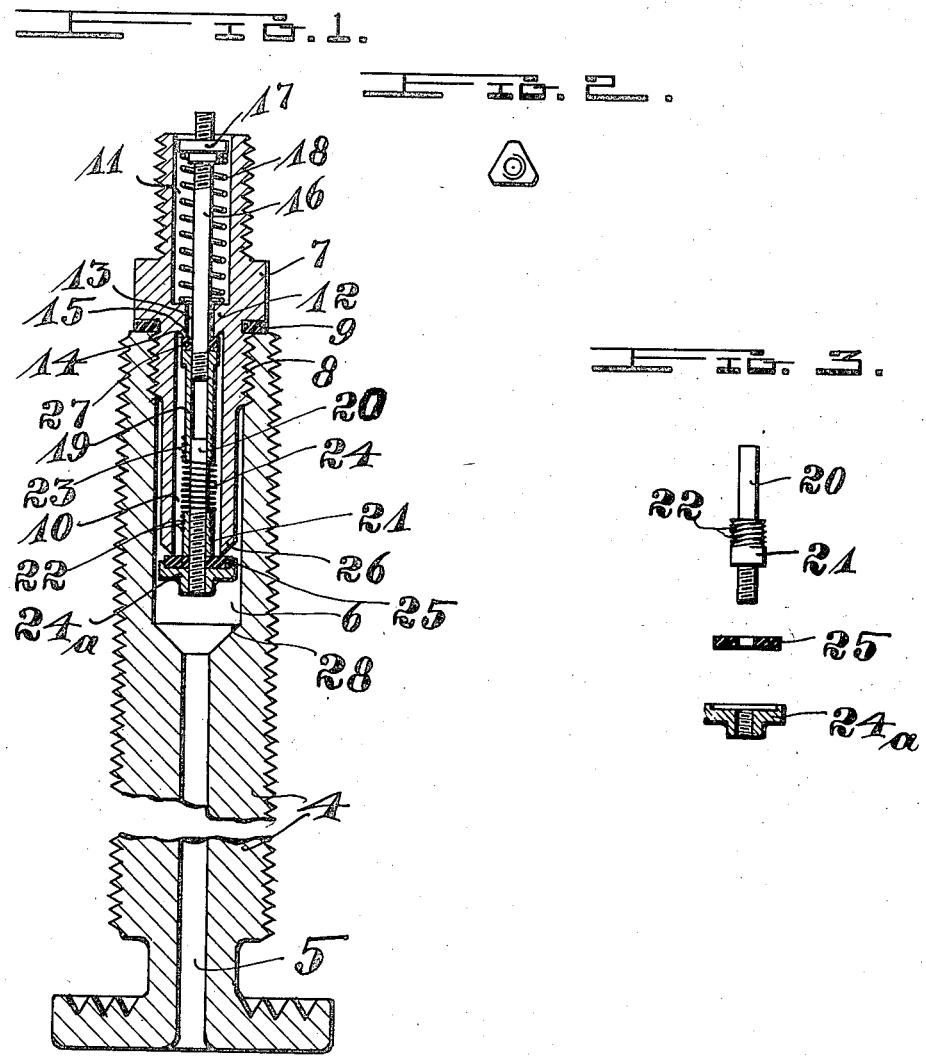
INVENTOR:
HERMAN F. RICHTER,
BY: Otto H. Krueger,
his Atty.

UNITED STATES PATENT OFFICE.

HERMAN F. RICHTER, OF LOS ANGELES, CALIFORNIA.

PNEUMATIC-TIRE VALVE.

1,420,499.  Specification of Letters Patent.  Patented June 20, 1922.

Application filed February 12, 1921. Serial No. 444,558.

*To all whom it may concern:*

Be it known that I, HERMAN F. RICHTER, a citizen of the United States, residing at Los Angeles, in the county of Los Angeles and State of California, have invented a new and useful Pneumatic-Tire Valve, of which the following is a specification.

This invention relates to devices for controlling the air in pneumatic tires.

One of the objects of this invention is to provide a valve which can easily be adjusted and exchanged.

Another object is to provide a valve of a construction to avoid defects, and to keep the device in working order even if some of the parts should develop defects.

Another object is to provide a valve of this type with two separate seats and co-operating valve members, independently controlling the passage through the device.

Another object is to provide such a valve with means allowing a replenishing of packing and seating material by any and even an inexperienced operator.

Another object is to provide such a device in which any in the least suitable material, such as paper, rubber, and packing material, may be used to replace the original sealing and seating material, when the device shows signs of defects while traveling.

Another object is to provide the two valves on practically the same stem and controlled by individual springs, one spring having greater tension than the other, which insures the proper flexibility in controlling the seats.

Other objects will appear from the following description and appended claims as well as from the accompanying drawing, in which—

Fig. 1 is a general longitudinal midsectional view of the device, illustrated in proper relation to fragmentary portions of a valve stem used in pneumatic tires.

Fig. 2 is a top plan view of the nut for controlling the main spring on the valve stem.

Fig. 3 is a detail illustration of several parts in the lower end of the valve stem, the several parts being disengaged and slightly moved to a position spaced one from the other.

Pneumatic tire valves must be exceptionally flexible to be efficient. When injecting air, the valve must easily open; and, when stopping to inject air, the valve must automatically and immediately close to properly hold the injected air and every particle of the air. A slow movement of such an air valve in closing, normally means a loss of pressure from the moment of stopping injecting air. It is customary to test the pressure of the air in a tire on which such valves are used every time that air is injected into the tire, normally by applying a gauge. The applying of the gauge, however, normally necessitates the opening of the valve, and, if the valve does not and would not automatically and immediately close upon removing the gauge, it would naturally be impossible to ascertain the correct pressure in the tire, since such a valve would eventually allow air to pass out from the time that the pressure was registered by the gauge up to the time that such an imperfect valve closes or would close well enough to hold the pressure then in the tire.

The valve stem 4, illustrated in Fig. 1, is of the usual type normally inserted into the inner tube of a pneumatic tire. This stem 4 is provided with a longitudinal bore 5, in its outer portion 6 large enough to receive a valve construction. The valve proper is preferably inserted into this outer end or portion of the bore of the stem 4, and preferably screwed into the stem and thereby securely and airtight held to the stem. The valve body 7 is therefore provided with a threaded portion to engage with a threaded portion in the outer end of the bore 6, as indicated at 8. A packing ring 9 is disposed between the valve body and the stem 4 to assure an airtight joint between these two members when so screwed together. The valve body 7 is provided with the bore 10 from one end and the bore 11 from the opposite end so as to leave a shoulder portion 12, which in turn is provided with the bore 13. The inner termination 14 of the bore 10 is bored out deeper around its periphery so as to leave an edge closely around the smaller center bore 13 to form a valve seat 15. A center stem 16 is disposed through the center bore 13 spaced in the bore so as to form an air passage around the center stem through the bore while the stem 16 is in the bore. A nut 17 is provided on the upper end of the stem 16, so that the spring 18 can be inserted between this nut 17 and the shoulder portion 12 in the valve body. The nut 17 is preferably triangular as illustrated in Fig. 2 to form sufficient spaces for the air to pass around the nut when within the bore 11. A sleeve 19 is provided on the lower end of the stem 16. A stem 20 is provided for telescopic engagement with the sleeve 19. Another sleeve 21 is provided on the stem 20. The upper end 22 of the sleeve 21 and the lower end 23 of the upper sleeve 19 are provided with threads or circumferential grooves so that a spring 24 can be screwed to these screw-ends for operatively engaging the stem 20 with the stem 16. A nut $24_a$ is provided on the lower end of the stem 20. Between the nut $24_a$ and the lower end of the sleeve 21, a packing ring 25 is inserted for seating against the lower end 26 of the valve body 7. A packing ring 27 is inserted above the sleeve 19 to seat against the seat 15 within the valve body 7.

The interengaging of the two sleeves 19 and 21 by the spring 24 produces a co-acting in seating the two valves on the seats 15 and 26.

A breaking of one spring hardly influences the action of the valve controlled by the other spring. If the spring 18 should break, the material of the spring 18 is of such a size, as long as the coils of the spring 18 still surround the stem 16, so as to hold the stem 16 with the sleeve 19 in a position to allow the spring 24 to seat the packing 25 properly on the end 26. Spring 24 is made of lighter material than the spring 18, but closer wound than the spring 18 so as to allow the spring 24 to expand easily to quite an extent as long as the spring 18 is in working order and at the same time easily contracting enough even if the spring 18 through a break collapses more than normally. If the spring 24 should break, the spring 18 naturally engages just the same the packing 27 to the seat 15.

The space between the lower end 26 of the valve body 7 and the termination 28 of the bore 6 in the outer stem 4 is illustrated quite large, but it will easily be understood that this space should be not more than absolutely necessary to allow the air to easily pass between the open valve (that is, mainly the nut $24_a$) and the bore 6 above the termination 28. The illustration in Fig. 1 is really an enlarged view of the device, only shown in this enlarged scale to more clearly illustrate the several small detail parts, and some of the parts are rather out of scale just to appear clearly in the drawing. An illustration of this device can naturally not be made to proper scale and retain its clearness, since the working stem and the seats are normally so small not properly to be represented by ink lines on a drawing of this kind, and the illustrations in this drawing should therefore not be taken with any relation to the operation of the device beyond the above description.

The separated parts in Fig. 3 clearly illustrate that the nut $24_a$ can be removed from the stem 20 and the packing 25 exchanged, as soon as the assembled valve structure is removed from the outer valve stem 4. If this valve becomes leaky or out of working order, the valve body 7 is removed from the bore 6 of the outer stem, and the nut $24_a$ is removed from the lower end of the operating stem 20, that is, while the valve proper remains assembled, as will easily be understood. A suitable piece of soft paper, or rubber, or other similar suitable material is inserted in the cup-shaped face of the nut $24_a$ and the nut $24_a$ is replaced on the stem 20. Such an exchanging can in emergency cases easily be accomplished by an inexperienced person without much trouble, as will easily be understood.

Having thus described my invention, I claim:

1. In a pneumatic tire valve, in combination with a valve body having several seats, a stem consisting of sections having valve members corresponding to the seats in the said body and having telescoping means between the stem sections with spring interconnection.

2. In a pneumatic tire valve, in combination with a valve body having several seats, a stem consisting of sections having valve members corresponding to the seats in the said body and having spring interconnection between the stem sections.

3. In a pneumatic tire valve, a valve body having several seats, a valve stem having telescopic engaging sections, a spring for controlling the telescopic action of the stem, valve members on the stem to engage with the seats in the said body, a nut on one end of the stem, a main spring inserted between the nut and the body for operatively holding one of the valve members to one of the seats in the body, another nut on the opposite end of the stem in form of a valve member removably on the stem for exchangeably holding a packing member against the other seat.

In testimony that I claim the foregoing as my invention I have signed my name in the presence of two subscribing witnesses.

HERMAN F. RICHTER.

Witnesses:
OTTO H. KRUEGER,
JESSIE A. MANOCK.